(12) United States Patent
Li et al.

(10) Patent No.: US 11,588,263 B2
(45) Date of Patent: Feb. 21, 2023

(54) BATTERY PRODUCT

(71) Applicant: CONTEMPORARY AMPEREX TECHNOLOGY CO, LIMITED, Ningde (CN)

(72) Inventors: Jianwei Li, Ningde (CN); Libing Chan, Ningde (CN); Linggang Zhou, Ningde (CN); Zhiqin Weng, Ningde (CN); Shengshen Ruan, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/179,227

(22) Filed: Feb. 18, 2021

(65) Prior Publication Data
US 2021/0184381 A1 Jun. 17, 2021

Related U.S. Application Data (63) Continuation of application No. 16/669,055, filed on Oct. 30, 2019, now Pat. No. 10,965,050.

(30) Foreign Application Priority Data

Nov. 14, 2018 (CN) .......................... 201821875762.6

(51) Int. Cl.
*H01R 13/05* (2006.01)
*H01R 13/627* (2006.01)
(Continued)

(52) U.S. Cl.
CPC ........ *H01R 13/052* (2013.01); *H01M 50/528* (2021.01); *H01R 13/6275* (2013.01); *H01R 13/631* (2013.01)

(58) Field of Classification Search
CPC ...... H01R 13/052; H01R 13/40; H01R 13/42; H01R 13/46; H01R 13/506; H01R 13/516;
(Continued)

(56) References Cited

U.S. PATENT DOCUMENTS 5,274,729 A * 12/1993 King ...................... G02B 6/264
385/59
6,741,783 B2 5/2004 Shibutani et al.
(Continued)

FOREIGN PATENT DOCUMENTS

CN 106558798 A 4/2017
CN 206893896 U 1/2018
(Continued)

OTHER PUBLICATIONS

Contemporary Amperex Technology Co., Limited, International Search Report and Written Opinion, PCT/CN2019/114413, dated Jan. 6, 2020, 16 pgs.
(Continued)

*Primary Examiner* — Oscar C Jimenez
(74) *Attorney, Agent, or Firm* — Morgan, Lewis & Bockius LLP (57) ABSTRACT

The present disclosure provides a battery product and an assembling method of the battery product, the battery product comprises a box and a heating connector. The box comprises a mounting panel. The mounting panel has a first receptacle portion and a second receptacle portion, and the second receptacle portion and the first receptacle portion are provided opposite to each other and communicating with each other. The heating connector comprises: a first plug assembly being mounted on the first receptacle portion; and a second plug assembly being mounted on the second receptacle portion. Compared with the technology related to
(Continued)

the background, the battery product is equivalent to directly integrating the receptacle of the heating connector on the mounting panel, which not only eliminates the manner of fixing by the bolt, but also improves the integration of the battery product, thereby improving the space utilization and energy density.

11 Claims, 6 Drawing Sheets

(51) Int. Cl.
  *H01R 13/631* (2006.01)
  *H01M 50/528* (2021.01)
(58) Field of Classification Search
  CPC .............. H01R 13/518; H01R 13/6271; H01R 13/6272; H01R 13/631; G02B 6/3825; G02B 6/3893; G02B 6/3897
  See application file for complete search history.

(56) References Cited

U.S. PATENT DOCUMENTS

| | | | |
|---|---|---|---|
| 8,679,666 | B1 | 3/2014 | Tsukkamoto et al. |
| 10,965,050 | B2 * | 3/2021 | Li ....................... H01M 10/615 |
| 2001/0021607 | A1 | 9/2001 | Schmid et al. |
| 2002/0061171 | A1 * | 5/2002 | Asada ................. G02B 6/3878 385/60 |
| 2007/0032129 | A1 | 2/2007 | Kim et al. |
| 2009/0148101 | A1 * | 6/2009 | Lu ........................ G02B 6/3821 385/56 |
| 2011/0085774 | A1 * | 4/2011 | Murphy ............... G02B 6/3893 264/1.25 |
| 2016/0301111 | A1 | 10/2016 | Tyler et al. |
| 2017/0133789 | A1 | 5/2017 | Haegele et al. |
| 2021/0026078 | A1 * | 1/2021 | Takano ................ G02B 6/3891 |

FOREIGN PATENT DOCUMENTS

| | | |
|---|---|---|
| CN | 208014788 U | 10/2018 |
| CN | 208955349 U | 6/2019 |
| JP | H05343041 A | 12/1993 |
| JP | H05343042 A | 12/1993 |
| JP | 2006040547 A | 2/2006 |
| JP | 2016149206 A | 8/2016 |

OTHER PUBLICATIONS

Contemporary Amperex Technology Co., Limited, Extended European Search Report, EP19205288.4, dated Apr. 17, 2020, 9 pgs.
Notice of Reasons for Refusal, JP2019-194978 dated Oct. 30, 2020, 6 pgs.
Li, Office Action, U.S. Appl. No. 16/669,055, Aug. 4, 2020, 11 pgs.
Li, Notice of Allowance, U.S. Appl. No. 16/669,055, Dec. 14, 2020, 7 pgs.

* cited by examiner

BATTERY PRODUCT

CROSS-REFERENCE TO RELATED APPLICATIONS

The present application is a continuation of U.S. application Ser. No. 16/669,055, entitled "BATTERY PRODUCT" filed on Oct. 30, 2019, which claims priority to Chinese patent application No. CN201821875762.6, filed on Nov. 14, 2018, all of which are incorporated herein by reference in their entirety.

FIELD OF THE PRESENT DISCLOSURE

The present disclosure relates to the field of connector technology, and particularly relates to a battery product and an assembling method of the battery product.

BACKGROUND OF THE PRESENT DISCLOSURE

A conventional heating connector typically comprises a first plug assembly, a receptacle, and a second plug assembly, the first plug assembly and the second plug assembly are assembled with the receptacle. When the heating connector is applied to a battery product (the battery product comprises a box, the box comprises a mounting panel), the receptacle of the heating connector is fixedly mounted on the mounting panel of the battery product by a bolt.

In the battery product, because the heating connector has the characteristics of the high voltage and low current, and in order to meet the requirement of creepage distance of the heating connector, a design size of the heating connector tends to be too larger, thereby resulting in that the heating connector takes up a larger region on the mounting panel of the battery product, which severely constrains the improvement on the space utilization and energy density of the battery product.

SUMMARY OF THE PRESENT DISCLOSURE

In view of the problem existing in the background, an object of the present disclosure is to provide a battery product and an assembling method of the battery product, the battery product has a high integration and improves the space utilization and energy density of the battery product.

In order to achieve the above object, in a first aspect, the present disclosure provides a battery product, which comprises a box and a heating connector. The box comprises a mounting panel, and the heating connector is mounted on the mounting pane. The mounting panel has: a main body portion; a first receptacle portion protruding from the main body portion and positioned at an outer side of the box; and a second receptacle portion protruding from the main body portion and positioned at an inner side of the box, and the second receptacle portion and the first receptacle portion are provided opposite to each other and communicated with each other in a longitudinal direction. The heating connector comprises: a first plug assembly mounted on the first receptacle portion; and a second plug assembly mounted on the second receptacle portion and connected to the first plug assembly.

The first receptacle portion has: a first wall; and a first connecting portion provided at an outer side of the first wall. The first plug assembly comprises: a first shell cooperating with the first wall; and a first connecting member provided at an outer side of the first shell and connected to the first connecting portion. Moreover, the first receptacle portion further has a first positioning portion provided at the outer side of the first wall. The first shell has: a first body portion sheathing the first wall; a first mounting portion protruding from the first body portion, and the first connecting member is provided on the first mounting portion; and a second positioning portion provided at an inner side of the first body portion and cooperating with the first positioning portion by a concave-convex fit.

The first connecting member is provided on the first mounting portion of the first shell in a cantilever manner. The first plug assembly further comprises a first locking member provided on the first mounting portion of the first shell. One end of the first connecting member is latched with the first connecting portion, and the first locking member makes the other end of the first connecting member fixed.

The first shell further has a first fixing groove provided on the first mounting portion. The first locking member has: a first base portion; a first extending portion protruding from the first base portion; a first elastic portion, one end of the first elastic portion is connected to the first base portion, the other end of the first elastic portion is space apart from the first base portion; and a first latching portion provided at the other end of the first elastic portion and protruding from the first elastic portion, and the first latching portion cooperates with the first fixing groove to make the other end of the first connecting member fixed. Moreover, the first locking member further has: a first guiding portion protruding from the first elastic portion and spaced apart from the first latching portion; and a first handle portion connected to the first base portion and protruding from the first base portion. In addition, the first shell further has a first guiding groove spaced apart from the first fixing groove.

The second receptacle portion has: a second wall; and a second connecting portion provided at an outer side of the second wall. The second plug assembly comprises: a second shell cooperating with the second wall; and a second connecting member provided at an outer side of the second shell and connected to the second connecting portion. Moreover, the second receptacle portion further has a third positioning portion provided at the inner side of the second wall. The second shell has: a second body portion received in the second wall; a second mounting portion protruding from the second body portion, and the second connecting member is provided on the second mounting portion; and a fourth positioning portion provided at an outer side of the second body portion and cooperating with the third positioning portion by a concave-convex fit.

The second connecting member is provided on the second mounting portion of the second shell in a cantilever manner. The second plug assembly further comprises a second locking member provided on the second mounting portion of the second shell. One end of the second connecting member is latched with the second connecting portion, and the second locking member makes the other end of the second connecting member fixed.

The second shell further has a second fixing groove provided on the second mounting portion. The second locking member has: a second base portion; a second extending portion protruding from the second base portion; a second elastic portion, one end of the second elastic portion is connected to the second base portion, the other end of the second elastic portion is spaced apart from the second base portion; and a second latching portion provided at the other end of the second elastic portion and protruding from the second elastic portion, and the second latching portion cooperates with the second fixing groove of the second shell to make the other end of the second connecting member fixed. Moreover, the second locking member further has: a second guiding portion protruding from the second elastic portion and spaced apart from the second latching portion; and a second handle portion connected to the second base portion and protruding from the second base portion. In addition, the second shell further has a second guiding groove spaced apart from the second fixing groove.

The main body portion is provided with an avoiding groove provided facing the second connecting portion of the second receptacle portion.

In a second aspect, the present disclosure further provides an assembling method of the battery product, and the battery product comprises a box and a heating connector. The box comprises a mounting panel, and the mounting panel has a first receptacle portion positioned at an outer side of the box. The first receptacle portion has a first connecting portion. The heating connector comprises a first plug assembly, and the first plug assembly comprises a first shell, a first connecting member and a first locking member. The first shell has a first fixing groove and a first guiding groove. The first locking member has: a first extending portion; a first latching portion; a first guiding portion spaced apart from the first latching portion; and a first handle portion. The assembling method of the battery product comprises steps of: making one end of the first connecting member of the first plug assembly of the heating connector latched with the first connecting portion of the first receptacle portion of the mounting panel; pushing the first handle portion of the first locking member of the first plug assembly in the longitudinal direction to make the first guiding portion move toward the mounting pane along the first guiding groove until the first latching portion is inserted into the first fixing groove, and at this time the first extending portion supports the other end of the first connecting member.

In a third aspect, the present disclosure further provides an assembling method of the battery product, and the battery product comprises a box and a heating connector. The box comprises a mounting panel, and the mounting panel has a second receptacle portion positioned at an inner side of the box. the second receptacle portion has a second connecting portion. The heating connector comprising a second plug assembly, and the second plug assembly comprises a second shell, a second connecting member and a second locking member. The second shell has a second fixing groove and a second guiding groove spaced apart from the second fixing groove. The second locking member has: a second extending portion; a second latching portion; a second guiding portion spaced apart from the second latching portion; and a second handle portion. The assembling method of the battery product comprises steps of: making one end of the second connecting member of the second plug assembly of the heating connector latched with the second connecting portion of the second receptacle portion of the mounting panel; pushing the second handle portion of the second locking member of the second plug assembly in the longitudinal direction to make the second guiding portion move toward the mounting pane along the second guiding groove until the second latching portion is inserted into the second fixing groove, and at this time the second extending portion supports the other end of the second connecting member.

The present disclosure has the following beneficial effects: since the mounting panel of the box is directly formed with the first receptacle portion for mounting the first plug assembly and the second receptacle portion for mounting the second plug assembly, compared with the technology related to the background, the battery product of the present disclosure is equivalent to directly integrating the receptacle of the heating connector on the mounting panel, which not only eliminates the manner of fixing by the bolt, but also improves the integration of the battery product, thereby improving the space utilization and energy density of the battery product.

REFERENCE NUMERALS ARE REPRESENTED AS FOLLOWS

1 mounting panel
11 main body portion
11A avoiding groove
12 first receptacle portion
121 first wall
122 first connecting portion
123 first positioning portion
13 second receptacle portion
131 second wall
132 second connecting portion
133 third positioning portion
2 heating connector
21 first plug assembly
211 first shell
211A first body portion
211B first mounting portion
211C second positioning portion
211D first fixing groove
211E first guiding groove
212 first connecting member
213 first locking member
213A first base portion
213B first extending portion
213C first elastic portion
213D first latching portion
213E first guiding portion
213F first handle portion
214 mounting shell
215 first conductive terminal
216 first wire harness body
217 first sealing ring
218 fixing cover
22 second plug assembly
221 second shell
221A second body portion
221B second mounting portion 221C fourth positioning portion
221D second fixing groove
221E second guiding groove
222 second connecting member
223 second locking member
223A second base portion
223B second extending portion
223C second elastic portion
223D second latching portion
223E second guiding portion
223F second handle portion
224 second conductive terminal
225 second wire harness body
226 second sealing ring
A first sealing member
B second sealing member
Y longitudinal direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and the like are only used for illustrative purposes and are not to be construed as expressing or implying a relative importance. The term "plurality" is two or more. Unless otherwise defined or described, the terms "connect", "fix", "mount" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "in or inside", "outside" and the like, are described based on orientations illustrated in the figures, but are not intended to limit the embodiments of the present disclosure. In addition, in the context, it is to be understood that when one element is provided as "in or inside" or "outside" another element, the one element can be directly placed as "in or inside" or "outside" the another element, and the one element can be also indirectly placed as "in or inside" or as outside" the another element.

Figure 1:
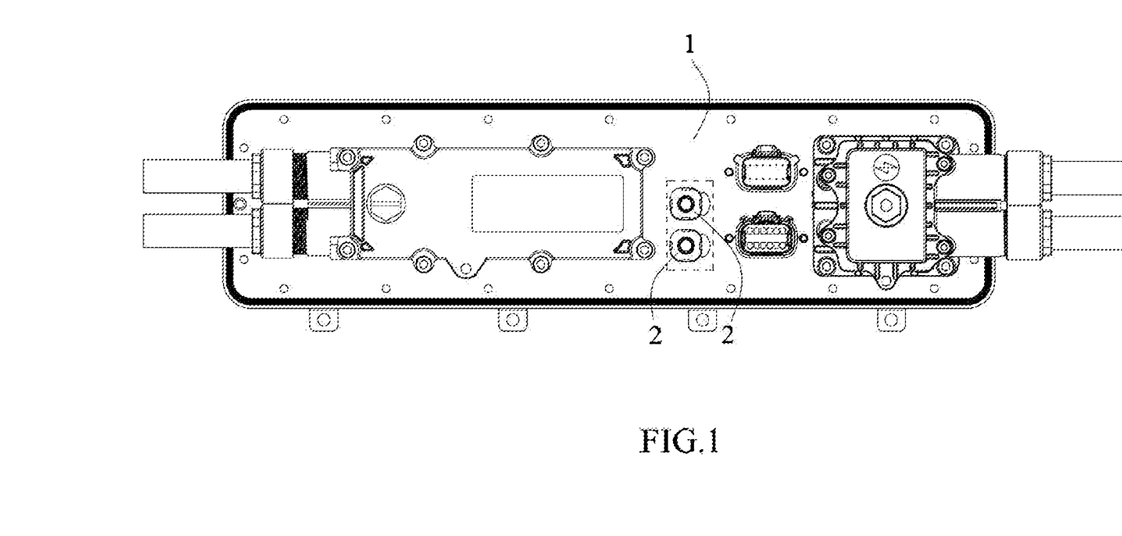
FIG. 1 is a schematic view showing the mounting between a heating connector and a mounting panel of a box in a battery product according to the present disclosure.
Figure 2:
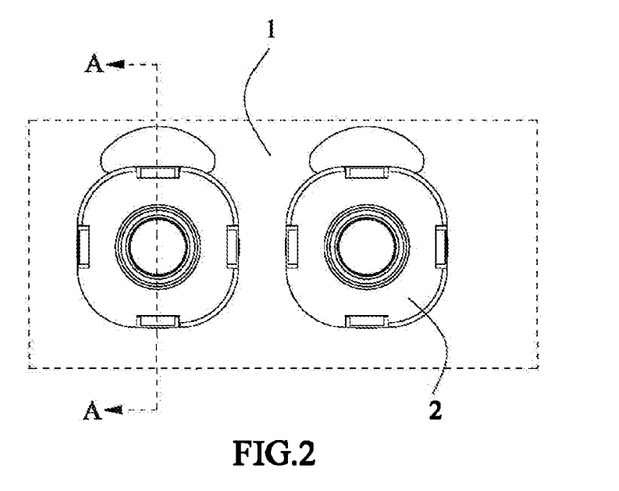
FIG. 2 is an enlarged view of a part of FIG. 1 indicated by a dotted line.
Figure 3:
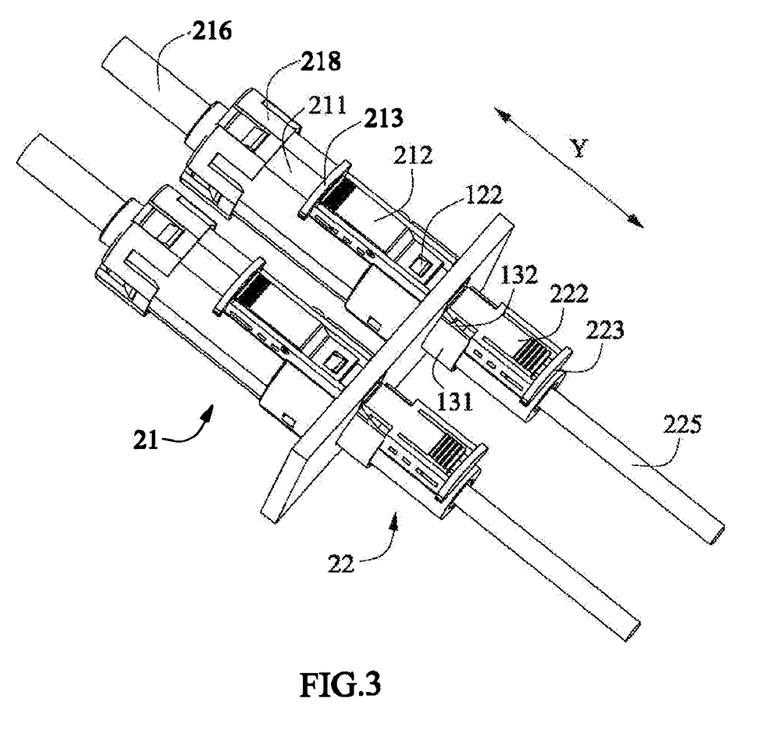
FIG. 3 is a perspective view of the part as shown in FIG. 2.

Referring to FIG. 1 to FIG. 3, a battery product of the present disclosure comprises a battery, a box, a heating film and a heating connector 2. The box comprises a mounting panel 1 (the mounting panel 1 may be a wall of the box or a plate of an integrated connector mounted on the wall of the box), and the heating connector 2 is mounted on the mounting panel 1. The heating film is positioned inside the box and electrically connected with the heating connector 2 to heat the battery inside the box. The battery product may be a battery pack or a high-voltage cartridge.

Referring to FIG. 4 to FIG. 7, the mounting panel 1 has: a main body portion 11; a first receptacle portion 12 protruding from the main body portion 11 and positioned at an outer side of the box; and a second receptacle portion 13 protruding from the main body portion 11 and positioned at an inner side of the box, and the second receptacle portion 13 and the first receptacle portion 12 are provided opposite to each other and communicated with each other in a longitudinal direction Y. Here, the longitudinal direction Y is a thickness direction of the mounting panel 1.

Figure 4:
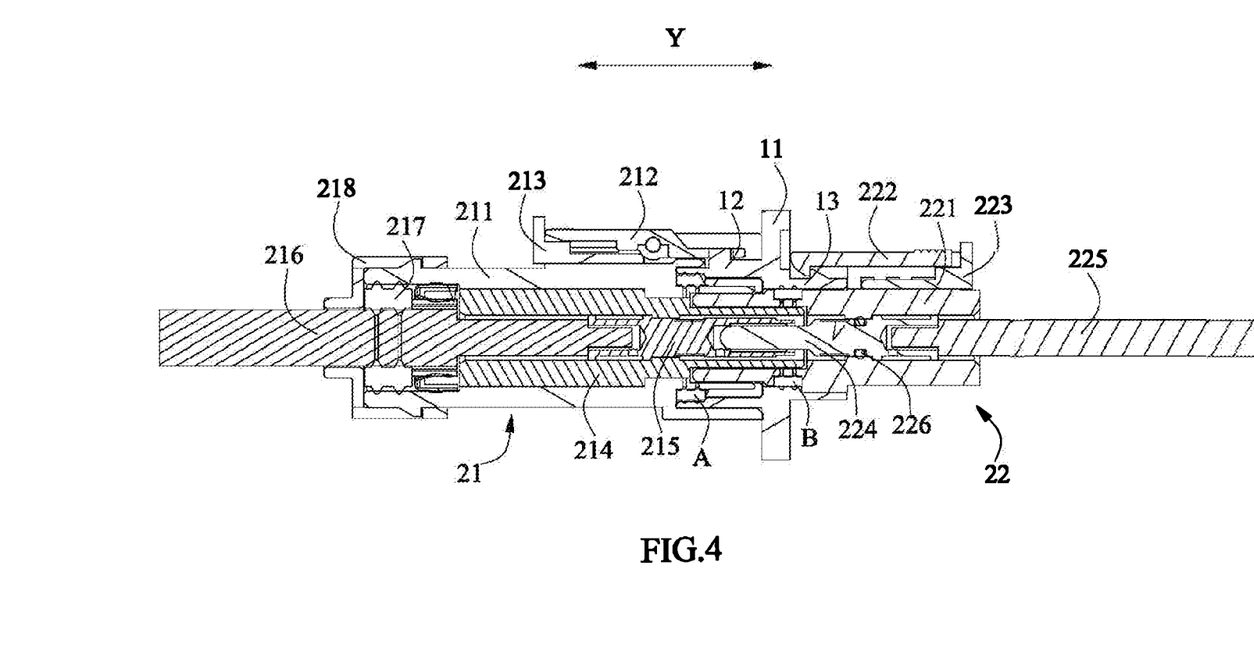
FIG. 4 is a cross sectional view taken along an A-A line of FIG. 2.
Figure 5:
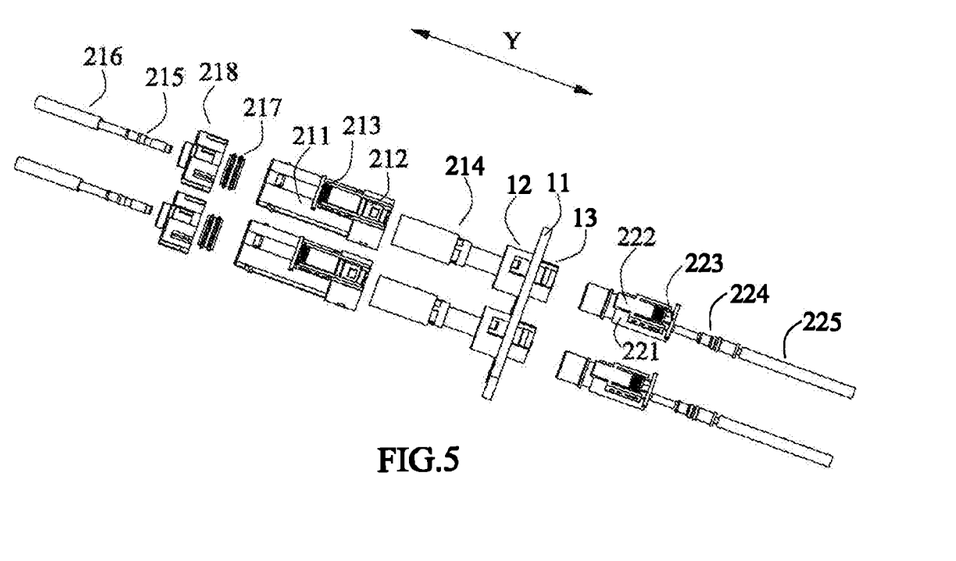
FIG. 5 is an exploded view of FIG. 3.

Referring to FIG. 3 to FIG. 5, the heating connector 2 comprises a first plug assembly 21 and a second plug assembly 22. The first plug assembly 21 is mounted on the first receptacle portion 12 of the mounting panel 1 from outside the box, the second plug assembly 22 is mounted on the second receptacle portion 13 from inside the box and connected to the first plug assembly 21.

Since the mounting panel 1 of the box is directly formed with the first receptacle portion 12 for mounting the first plug assembly 21 and the second receptacle portion 13 for mounting the second plug assembly 22, compared with the technology related to the background, the battery product of the present disclosure is equivalent to directly integrating the receptacle of the heating connector 2 on the mounting panel 1 (i.e., there is no need to provide a receptacle independent from the mounting panel 1), which not only eliminates the manner of fixing by the bolt, but also improves the integration of the battery product, thereby improving the space utilization and energy density of the battery product.

Referring to FIG. 1 to FIG. 3, the heating connector 2 may be provided as two in number. After the two heating connectors 2 are mounted on the mounting panel 1, both the first plug assemblies 21 of the two heating connectors 2 are electrically connected to a power supplying device outside the box, and the second plug assembly 22 of one heating connector 2 is electrically connected to a positive electrode of the heating film inside the box, the second plug assembly 22 of the other heating connector 2 is electrically connected to a negative electrode of the heating film inside the box, therefore the electrical connection of the entire heating system is completed, thereby realizing the heating of the battery inside the box.

Figure 6:
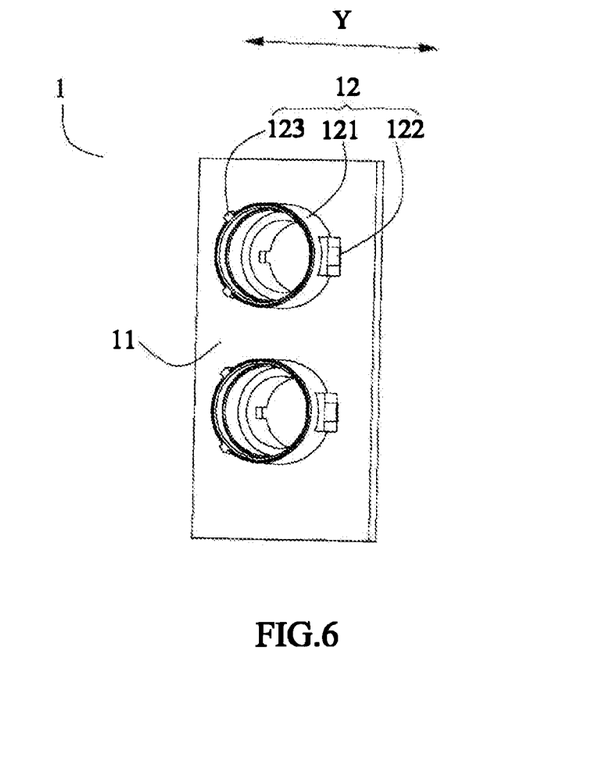
FIG. 6 is a perspective view of the mounting panel from an angle.
Figure 8:
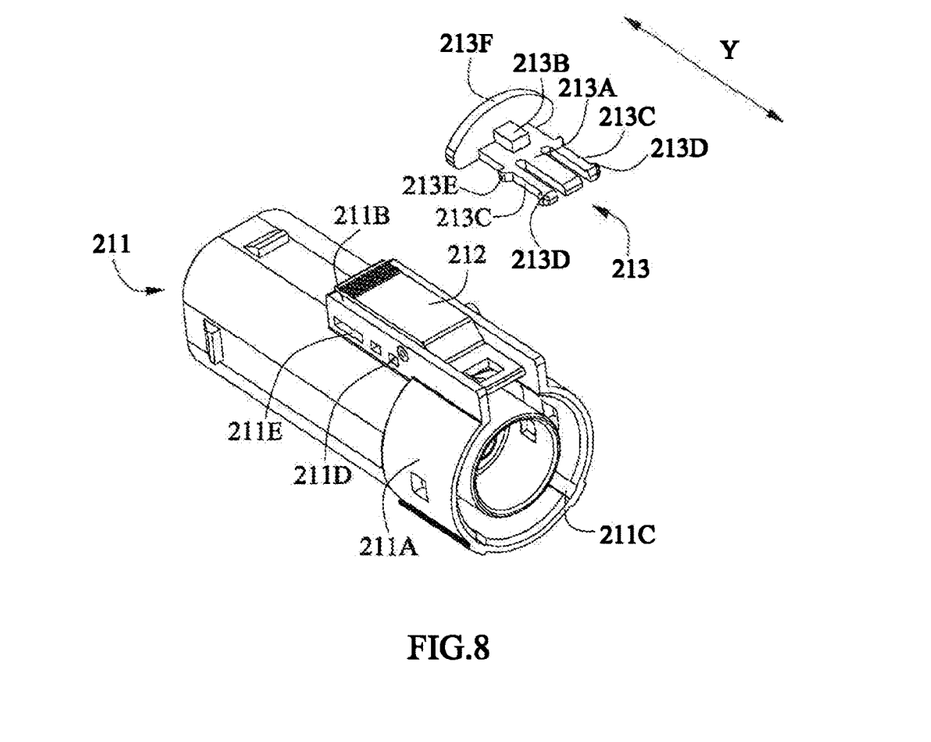
FIG. 8 is an exploded view of a first locking member and a first shell of a first plug assembly.

Referring to FIG. 6, the first receptacle portion 12 may have: a first wall 121; and a first connecting portion 122 provided at an outer side of the first wall 121. Referring to FIG. 8, the first plug assembly 21 may comprise: a first shell 211; and a first connecting member 212 provided at an outer side of the first shell 211.

When the first plug assembly 21 is assembled with the first receptacle portion 12, referring to FIG. 3 and FIG. 4, it directly makes the first shell 211 of the first plug assembly 21 cooperate with the first wall 121 of the first receptacle portion 12 by a method of inserting connection, then makes the first connecting member 212 connected to the first connecting portion 122, thereby completing the assembling. This method of assembling is simple and fast, and improves the assembling efficiency of the battery product.

Referring to FIG. 6, the first receptacle portion 12 may further have a first positioning portion 123 provided at the outer side of the first wall 121. Referring to FIG. 8, the first shell 211 may have: a first body portion 211A sheathing the first wall 121; a first mounting portion 211B protruding from the first body portion 211A, and the first connecting member 212 is provided on the first mounting portion 211B; and a second positioning portion 211C provided at an inner side of the first body portion 211A and cooperating with the first positioning portion 123 by a concave-convex fit.

Based on the arrangement of the second positioning portion 211C and the first positioning portion 123, the first body portion 211A of the first shell 211 can quickly and accurately sheathe the first wall 121 of the first receptacle portion 12, thereby ensuring that the relative position between the first connecting member 212 and the first connecting portion 122 is accurate to facilitate connection, further improving the assembling efficiency of the battery product.

Specifically, the first positioning portion 123 may be a protrusion (as shown in FIG. 6), and the second positioning portion 211C is a recessed groove (as shown in FIG. 8). Alternatively, the first positioning portion 123 may be a recessed groove, and the second positioning portion 211C is a protrusion.

Referring to FIG. 3, FIG. 4 and FIG. 8, the first connecting member 212 is provided on the first mounting portion 211B of the first shell 211 in a cantilever manner. The first plug assembly 21 may further comprise a first locking member 213 provided on the first mounting portion 211B of the first shell 211. One end of the first connecting member 212 is latched with the first connecting portion 122, and the first locking member 213 makes the other end of the first connecting member 212 fixed.

Figure 9:
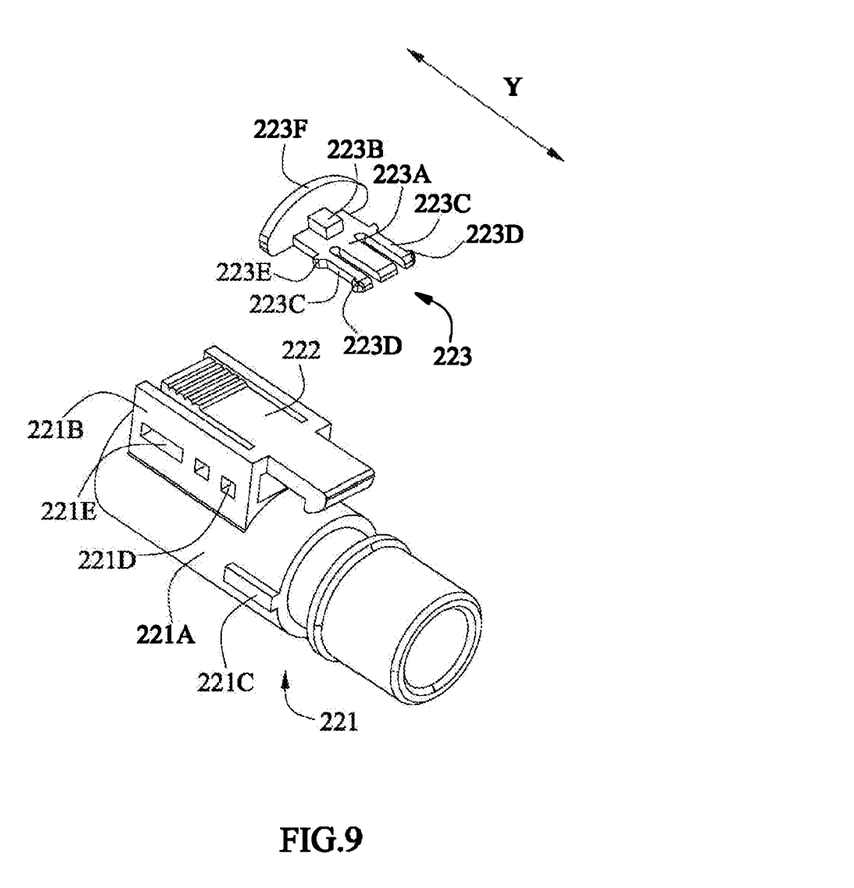
FIG. 9 is an exploded view of a second locking member and a second shell of a second plug assembly.

It should be noted that, the first connecting member 212 may be integrally formed with the first mounting portion 211B (i.e., it is similar to the connection relationship between the second connecting member 222 and the second mounting portion 221B of the second shell 221 of FIG. 9) or the first connecting member 212 is connected to the first mounting portion 211B by a pin (as shown in FIG. 8).

In one embodiment, the first connecting portion 122 may be a protrusion (as shown in FIG. 6), and the one end of the first connecting member 212 is provided with a through hole (as shown in FIG. 8), the first connecting portion 122 is received in the through hole to make the one end of the first connecting member 212 latch with the first connecting portion 122.

In another embodiment, the first connecting portion 122 may be a recessed groove, and the one end of the first connecting member 212 is provided with a protrusion, the protrusion latches into the first connecting portion 122 to make the one end of the first connecting member 212 latch with the first connecting portion 122.

In still another embodiment, the first connecting portion 122 may be a protrusion, the one end of the first connecting member 212 is also provided with a protrusion, the protrusion of the first connecting member 212 is latched between the first connecting portion 122 and the main body portion 11 (i.e., it is similar to the connection relationship between the second connecting member 222 and the second connecting portion 132 of the second receptacle portion 13 of FIG. 4) to make the one end of the first connecting member 212 latch with the first connecting portion 122.

Referring to FIG. 8, the first shell 211 may further have a first fixing groove 211D provided on the first mounting portion 211B. The first locking member 213 may have: a first base portion 213A; a first extending portion 213B protruding from the first base portion 213A; a first elastic portion 213C, one end of the first elastic portion 213C is connected to the first base portion 213A, the other end of the first elastic portion 213C is spaced apart from the first base portion 213A; and a first latching portion 213D provided at the other end of the first elastic portion 213C and protruding from the first elastic portion 213C, and the first latching portion 213D cooperates with the first fixing groove 211D.

Referring to FIG. 8 again, the first shell 211 may further have a first guiding groove 211E spaced apart from the first fixing groove 211D. The first locking member 213 may further have: a first guiding portion 213E protruding from the first elastic portion 213C and spaced apart from the first latching portion 213D; and a first handle portion 213F connected to the first base portion 213A and protruding from the first base portion 213A.

During the assembling process of the first plug assembly 21 and the first receptacle portion 12, after the one end of the first connecting member 212 is latched with the first connecting portion 122, the first handle portion 213F of the first locking member 213 is pushed in the longitudinal direction Y to make the first guiding portion 213E move toward the mounting panel along the first guiding groove 211E until the first latching portion 213D is inserted into the first fixing groove 211D, and at this time the first extending portion 213B supports the other end of the first connecting member 212, thereby realizing the fixing of the other end of the first connecting member 212 by the first locking member 213.

When it is necessary to disassemble the first plug assembly 21 and the first receptacle portion 12, firstly, the first handle portion 213F of the first locking member 213 is reversely pulled in the longitudinal direction Y, and the first latching portion 213D presses the first elastic portion 213C to make the other end of the first elastic portion 213C move toward the first base portion 213A until the first latching portion 213D is detached from the first fixing groove 211D, and at this time the first extending portion 213B is positioned at an outer side of the first connecting member 212 in the longitudinal direction Y; then the other end of the first connecting member 212 is pressed downwardly to relieve the latching between the one end of the first connecting member 212 and the first connecting portion 122; then the first plug assembly 21 is pulled out from the first receptacle portion 12.

In order to facilitate the cooperation between the first latching portion 213D and the first fixing groove 211D, an outer surface of the first latching portion 213D may be a smooth curved surface.

Figure 7:
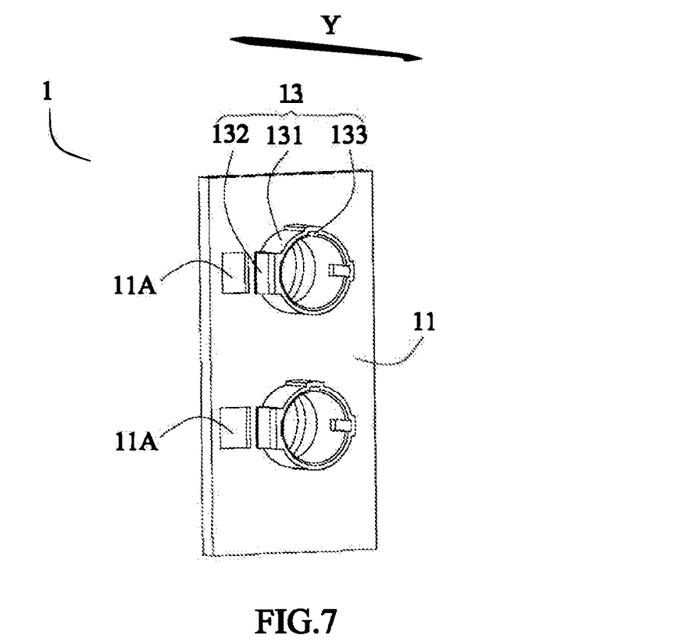
FIG. 7 is a perspective view of the mounting panel from another angle.

Referring to FIG. 7, the second receptacle portion 13 may have: a second wall 131; and a second connecting portion 132 provided at an outer side of the second wall 131. Referring to FIG. 9, the second plug assembly 22 may comprise: a second shell 221 cooperating with the second wall 131; and a second connecting member 222 provided at an outer side of the second shell 221 and connected to the second connecting portion 132.

When the second plug assembly 22 is assembled with the second receptacle portion 13, referring to FIG. 3 and FIG. 4, it directly makes the second shell 221 of the second plug assembly 22 cooperate with the second wall 131 of the second receptacle portion 13 by a method of inserting connection, then makes the second connecting member 222 connected to the second connecting portion 132, thereby completing the assembling. This method of assembling is simple and fast, and improves the assembling efficiency of the battery product.

Referring to FIG. 7, the second receptacle portion 13 may further have: a third positioning portion 133 provided at an inner side of the second wall 131. Referring to FIG. 9, the second shell 221 may have: a second body portion 221A received in the second wall 131; a second mounting portion 221B protruding from the second body portion 221A, and the second connecting member 222 is provided on the second mounting portion 221B; and a fourth positioning portion 221C provided at an outer side of the second body portion 221A and cooperating with the third positioning portion 133 by a concave-convex fit.

Based on the arrangement of the third positioning portion 133 and the fourth positioning portion 221C, the second body portion 221A of the second shell 221 can be quickly and accurately inserted in the second wall 131 of the second receptacle portion 13, which ensures that the relative position between the second connecting member 222 and the second connecting portion 132 is accurate to facilitate connection, thereby further improving the assembling efficiency of the battery product.

Specifically, the third positioning portion 133 may be a protrusion, and the fourth positioning portion 221C is a recessed groove. Alternatively, the third positioning portion 133 may be a recessed groove (as shown in FIG. 7), and the fourth positioning portion 221C is a protrusion (as shown in FIG. 9).

Referring to FIG. 3, FIG. 4 and FIG. 9, the second connecting member 222 is provided on the second mounting portion 221B of the second shell 221 in a cantilever manner. The second plug assembly 22 may further comprise: a second locking member 223 provided on the second mounting portion 221B of the second shell 221. One end of the second connecting member 222 is latched with the second connecting portion 132, and the second locking member 223 makes the other end of the second connecting member 222 fixed.

It should be noted that, the second connecting member 222 may be integrally formed with the second mounting portion 221B (as shown in FIG. 9) or the second connecting member 222 is connected to the second mounting portion 221B by a pin (i.e., it is similar to the connection relationship between the first connecting member 212 and the first mounting portion 211B of the first shell 211 of FIG. 8).

In one embodiment, the second connecting portion 132 may be a protrusion, and the one end of the second connecting member 222 is provided with a through hole, the second connecting portion 132 is received in the through hole (i.e., it is similar to the connection relationship between the first connecting member 212 and the first connecting portion 122 of the first receptacle portion 12 of FIG. 4) to make the one end of the second connecting member 222 latch with the second connecting portion 132.

In another embodiment, the second connecting portion 132 may be a recessed groove, and the one end of the second connecting member 222 is provided with a protrusion, the protrusion latches into the second connecting portion 132 to make the one end of the second connecting member 222 latch with the second connecting portion 132.

In still another embodiment, the second connecting portion 132 may be a protrusion (as shown in FIG. 7), the one end of the second connecting member 222 is also provided with a protrusion (as shown in FIG. 9), the protrusion of the second connecting member 222 is latched between the second connecting portion 132 and the main body portion 11 to make the one end of the second connecting member 222 latch with the second connecting portion 132.

Referring to FIG. 9, the second shell 221 may further have a second fixing groove 221D provided on the second mounting portion 221B. The second locking member 223 may have: a second base portion 223A; a second extending portion 223B protruding from the second base portion 223A; a second elastic portion 223C, one end of the second elastic portion 223C is connected to the second base portion 223A, the other end of the second elastic portion 223C is spaced apart from the second base portion 223A; and a second latching portion 223D provided at the other end of the second elastic portion 223C and protruding from the second elastic portion 223C, and the second latching portion 223D cooperates with the second fixing groove 221D of the second shell 221.

Referring to FIG. 9 again, the second shell 221 may have a second guiding groove 221E spaced apart from the second fixing groove 221D. The second locking member 223 may further have: a second guiding portion 223E protruding from the second elastic portion 223C and spaced apart from the second latching portion 223D; and a second handle portion 223F connected to the second base portion 223A and protruding from the second base portion 223A.

During the assembling process of the second plug assembly 22 and the second receptacle portion 13, after the one end of the second connecting member 222 is latched with the second connecting portion 132, the second handle portion 223F of the second locking member 223 is pushed in the longitudinal direction Y to make the second guiding portion 223E move toward the mounting panel 1 along the second guiding groove 221E until the second latching portion 223D is inserted into the second fixing groove 221D, and at this time the second extending portion 223B supports the other end of the second connecting member 222, thereby realizing the fixing of the other end of the second connecting member 222 by the second locking member 223.

When it is necessary to disassemble the second plug assembly 22 and the second socket portion 13, firstly, reversely pull the second handle portion 223F of the second locking member 223 in the longitudinal direction Y, the second holding portion 223D presses the second elastic portion 223C to make the other end of the second elastic portion 223C move toward the second base portion 223A until the second holding portion 223D is disengaged from the second fixing groove 221D, and at this time the second extending portion 223B is positioned at an outer side of the second connecting member 222 in the longitudinal direction Y; then the other end of the second connecting member 222 is pressed downwardly to relieve the latching between the one end of the second connecting member 222 and the second connecting portion 132; later the second plug assembly 22 is pulled out from the second socket portion 13.

In order to facilitate the cooperation between the second latching portion 223D and the second fixing groove 221D, an outer surface of the second latching portion 223D may be a smooth curved surface.

Referring to FIG. 7, the main body portion 11 is provided with an avoiding groove 11A facing the second connecting portion 132 of the second receptacle portion 13. In the process of pressing the second connecting member 222, based on the arrangement of the avoiding groove 11A, the main body portion 11 can reserve a sufficient movable space for the second connecting member 222 to facilitate the assembling and disassembling.

Referring to FIG. 3 to FIG. 5, the first plug assembly 21 may further comprise: a mounting shell 214 provided in the first shell 211; and a first conductive terminal 215 mounted to the mounting shell 214. The second plug assembly 22 may further comprise a second conductive terminal 224 mounted to the second shell 221. After the first plug assembly 21 and the second plug assembly 22 are mounted to the mounting panel 1, the second shell 221 is assembled with the mounting shell 214, the second conductive terminal 224 is connected (e.g., the inserting connection) to the first conductive terminal 215.

Specifically, referring to FIG. 4, the first conductive terminal 215 is provided with an inserting hole, the second conductive terminal 224 is provided with an inserting pin. Alternatively, the first conductive terminal 215 is provided with an inserting pin, the second conductive terminal 224 is provided with an inserting hole.

Referring to FIG. 3 to FIG. 5, the first plug assembly 21 may further comprise a first wire harness body 216 connected (e.g., clamped) to one end of the first conductive terminal 215 away from the second conductive terminal 224. The second plug assembly 22 may further comprise a second wire harness body 225 connected (e.g., clamped) to one end of the second conductive terminal 224 away from the first conductive terminal 215. The first wire harness body 216 is used for electrically connecting the power supplying device outside the box, the second wire harness body 225 is used for electrically connecting the heating film inside the box.

Referring to FIG. 3 to FIG. 5, the first plug assembly 21 may further comprise: a first sealing ring 217 provided between the first wire harness body 216 and the first shell 211; and a fixing cover 218 fixed to the first shell 211 by the manner of latching. When mounting the fixing cover 218, the fixing cover 218 simultaneously presses the end surface and the outer circumferential surface of the first sealing ring 217, therefore a good sealing interface can be formed between the first wire harness body 216 and the first shell 211.

Referring to FIG. 3 to FIG. 5, the second plug assembly 22 may further comprise a second sealing ring 226 provided between the second conductive terminal 224 and the second shell 221 to seal the second conductive terminal 224 and the second shell 221.

Referring to FIG. 4, the battery product may further comprise: a first sealing member A sealing the first plug assembly 21 and the first receptacle portion 12; and a second sealing member B sealing the second plug assembly 22 and the second receptacle portion 13.

The first sealing ring 217, the second sealing ring 226, the first sealing member A and the second sealing member B together ensure the sealing performance of the heating connector 2, which makes the battery product satisfy the waterproof level of IP68.

What is claimed is:

1. A heating connector mounted on a mounting panel of a battery product, wherein the heating connector comprises:
    a first plug assembly mounted on a first receptacle portion of the mounting panel; and
    a second plug assembly mounted on a second receptacle portion of the mounting panel and electrically connected to the first plug assembly in a direction perpendicular to the mounting panel,
    wherein the first receptacle portion has: a first wall; and a first connecting portion provided at an outer side of the first wall;
    the first plug assembly comprises: a first shell cooperating with the first wall; and a first connecting member provided at an outer side of the first shell and connected to the first connecting portion;
    the second receptacle portion has: a second wall, a second connecting portion provided at an outer side of the second wall, and a third positioning portion provided at an inner side of the second wall; and
    the second plug assembly comprises: a second shell cooperating with the second wall; and a second connecting member provided at an outer side of the second shell and connected to the second connecting portion; the second shell having: a second body portion received in the second wall; a second mounting portion protruding from the second body portion, wherein the second connecting member is provided on the second mounting portion; and a fourth positioning portion provided at an outer side of the second body portion and cooperating with the third positioning portion by a concave-convex fit.

2. The heating connector according to claim 1, wherein the first receptacle portion further has a first positioning portion provided at the outer side of the first wall;
    the first shell has: a first body portion sheathing the first wall; a first mounting portion protruding from the first body portion, and the first connecting member is provided on the first mounting portion; and a second positioning portion provided at an inner side of the first body portion and cooperating with the first positioning portion by a concave-convex fit.

3. The heating connector according to claim 2, wherein the first connecting member is provided on the first mounting portion of the first shell in a cantilever manner;
    the first plug assembly further comprises a first locking member provided on the first mounting portion of the first shell;
    one end of the first connecting member is latched with the first connecting portion, and the first locking member makes the other end of the first connecting member fixed.

4. The heating connector according to claim 3, wherein the first shell further has a first fixing groove provided on the first mounting portion;
    the first locking member has: a first base portion; a first extending portion protruding from the first base portion; a first elastic portion, one end of the first elastic portion is connected to the first base portion, the other end of the first elastic portion is spaced apart from the first base portion; and a first latching portion provided at the other end of the first elastic portion and protruding from the first elastic portion, and the first latching portion cooperates with the first fixing groove to make the other end of the first connecting member fixed.

5. The heating connector according to claim 4, wherein the first locking member further has: a first guiding portion protruding from the first elastic portion and spaced apart from the first latching portion; and a first handle portion connected to the first base portion and protruding from the first base portion.

6. The heating connector according to claim 5, wherein the main body portion is provided with an avoiding groove provided facing the second connecting portion of the second receptacle portion.

7. The heating connector according to claim 4, wherein the first shell further has a first guiding groove spaced apart from the first fixing groove.

8. The heating connector according to claim 1, wherein:
    the second connecting member is provided on the second mounting portion of the second shell in a cantilever manner;
    the second plug assembly further comprises a second locking member provided on the second mounting portion of the second shell;
    one end of the second connecting member is latched with the second connecting portion, and the second locking member makes the other end of the second connecting member fixed.

9. The heating connector according to claim 8, wherein the second shell further has a second fixing groove provided on the second mounting portion;
    the second locking member has: a second base portion; a second extending portion protruding from the second base portion; a second elastic portion, one end of the second elastic portion is connected to the second base portion, the other end of the second elastic portion is spaced apart from the second base portion; and a second latching portion provided at the other end of the second elastic portion and protruding from the second elastic portion, and the second latching portion cooperates with the second fixing groove of the second shell to make the other end of the second connecting member fixed.

10. The heating connector according to claim 9, wherein the second locking member further has: a second guiding portion protruding from the second elastic portion and spaced apart from the second latching portion; and a second handle portion connected to the second base portion and protruding from the second base portion.

11. The heating connector according to claim 9, wherein the second shell further has a second guiding groove spaced apart from the second fixing groove.

* * * * *